United States Patent
Otranen et al.

(10) Patent No.: US 10,257,183 B2
(45) Date of Patent: *Apr. 9, 2019

(54) METHOD AND APPARATUS FOR IDENTITY FEDERATION GATEWAY

(71) Applicant: Nokia Technologies Oy, Espoo (FI)

(72) Inventors: Jari Tapio Otranen, Espoo (FI); Jari Anssi Petteri Mononen, Ruutana (FI); Jari Mikael Pehkonen, Tampere (FI); Pasi Allan Lantiainen, Vuorentausta (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,448

(22) Filed: May 22, 2017

(65) Prior Publication Data

US 2017/0324730 A1 Nov. 9, 2017

Related U.S. Application Data

(63) Continuation of application No. 15/139,070, filed on Apr. 26, 2016, now Pat. No. 9,660,975, which is a
(Continued)

(51) Int. Cl.
*H04L 29/06* (2006.01)
*H04L 9/32* (2006.01)
*G06F 21/41* (2013.01)

(52) U.S. Cl.
CPC .......... *H04L 63/0815* (2013.01); *G06F 21/41* (2013.01); *H04L 9/3213* (2013.01);
(Continued)

(58) Field of Classification Search
None
See application file for complete search history.

(56) References Cited

U.S. PATENT DOCUMENTS

| 7,562,382 B2 | 7/2009 | Hinton et al. |
| 7,631,346 B2 | 12/2009 | Hinton et al. |

(Continued)

FOREIGN PATENT DOCUMENTS

| CN | 101399671 A | 4/2009 |
| EP | 1104133 A1 | 5/2001 |

(Continued)

OTHER PUBLICATIONS

3GPP, "3rd Generation Partnership Project; Technical Specification Group Services and System Aspects; Identity management and 3GPP security interworking; Identity management and Generic Authentication Architecture (GAA) interworking (Release 9)", 3GPP Standard; 3GPP TR 33.924, 3rd Generation Partnership Project (3GPP), Mobile Competence Centre, No. V2.0.0, Dec. 15, 2009, 26 Pages.

(Continued)

*Primary Examiner* — Kaveh Abrishamkar
(74) *Attorney, Agent, or Firm* — Ditthavong & Steiner, P.C.

(57) ABSTRACT

Techniques for an ID federation gateway include determining whether a user associated with a request for a particular network resource is to be identified by the provider of the particular service or by a different party. The service also comprises causing the different party to provide identification data that indicates an identity for the user, if the user is to be identified by the different party. The method further comprises causing user credentials data, based on the identification data, to be sent to an authentication process of the provider for a set of one or more network resources that includes the particular network resource requested by the user, if the data indicates that the user is successfully identified.

20 Claims, 8 Drawing Sheets

Related U.S. Application Data continuation of application No. 14/454,228, filed on Aug. 7, 2014, now Pat. No. 9,325,693, which is a continuation of application No. 12/708,764, filed on Feb. 19, 2010, now Pat. No. 8,984,588.

(52) U.S. Cl.
CPC ............ *H04L 9/3271* (2013.01); *H04L 63/08* (2013.01); *H04L 63/0876* (2013.01); *H04L 63/102* (2013.01); *H04L 2209/80* (2013.01)

(56) References Cited

U.S. PATENT DOCUMENTS

| | | | |
|---|---|---|---|
| 7,672,680 | B1 | 3/2010 | Lee et al. |
| 8,984,588 | B2 * | 3/2015 | Otranen ................. H04L 63/08 713/168 |
| 9,325,693 | B2 * | 4/2016 | Otranen ................. H04L 63/08 |
| 9,660,975 | B2 * | 5/2017 | Otranen ................. H04L 63/08 |
| 2002/0116638 | A1 | 8/2002 | Dobes et al. |
| 2003/0051041 | A1 | 3/2003 | Kalavade et al. |
| 2004/0210771 | A1 | 10/2004 | Wood et al. |
| 2005/0204168 | A1 | 9/2005 | Johnston et al. |
| 2006/0185021 | A1 | 8/2006 | Dujari et al. |
| 2008/0010665 | A1 | 1/2008 | Hinton et al. |
| 2009/0064291 | A1 * | 3/2009 | Wahl .................. H04L 63/0815 726/5 |
| 2010/0242092 | A1 | 9/2010 | Harris et al. |

FOREIGN PATENT DOCUMENTS

| | | |
|---|---|---|
| EP | 1328102 A1 | 7/2003 |
| EP | 1610528 A2 | 12/2005 |
| WO | 2005064882 A2 | 7/2005 |
| WO | 2010041347 A1 | 4/2010 |

OTHER PUBLICATIONS

3GPP, "3rd Generation Partnership Project; Technical Specification Group Services and System Aspects; Liberty Alliance and 3GPP security interworking; Interworking of Liberty Alliance Identity Federation Framework (ID-FF), Identity Web Services Framework (ID-WSF) and Generic Authentication Architecture (GAA) (Release 9)", 3GPP Standard; 3GPP TR 33.980, 3rd Generation Partnership Project (3GPP), Mobile Competence Centre, No. V9.0.0, Dec. 18, 2009, 39 Pages.

Chinese Office Action for related Chinese Patent Application No. 201180010275.8 dated Aug. 29, 2014, with English-language summary, 8 Pages.

Chinese Office Action for related Chinese Patent Application No. 201180010275.8 dated May 11, 2015, with English-language summary, 4 Pages.

Chinese Office Action for related Chinese Patent Application No. 201180010275.8 dated Oct. 23, 2015, with English-language summary, 4 Pages.

European Office Action for related European Patent Application No. 11744315.0-1870 dated Apr. 3, 2017, 11 Pages.

International Search Report for corresponding PCT Application No. PCT/FI2011/050118, dated Jun. 9, 2011, 6 Pages.

Pashalidis et al., "Using GSM/UMTS for Single Sign-On", Joint First Workshop on Mobile Future and Symposium on Trends in Communication, SYMPOTI C '03, IEEE, Oct. 28, 2003, pp. 138-145.

Wikipedia, "Federated Identity", Jul. 3, 2017, retrieved from https://en.wikipedia.org/wiki/Federated_identity, 3 Pages.

Written Opinion for corresponding PCT Application No. PCT/FI2011/050118, dated Jun. 9, 2011, 10 Pages.

Office Action for related Indian Patent Application No. 8030/CHENP/2012, dated Dec. 5, 2018, 6 pages.

* cited by examiner

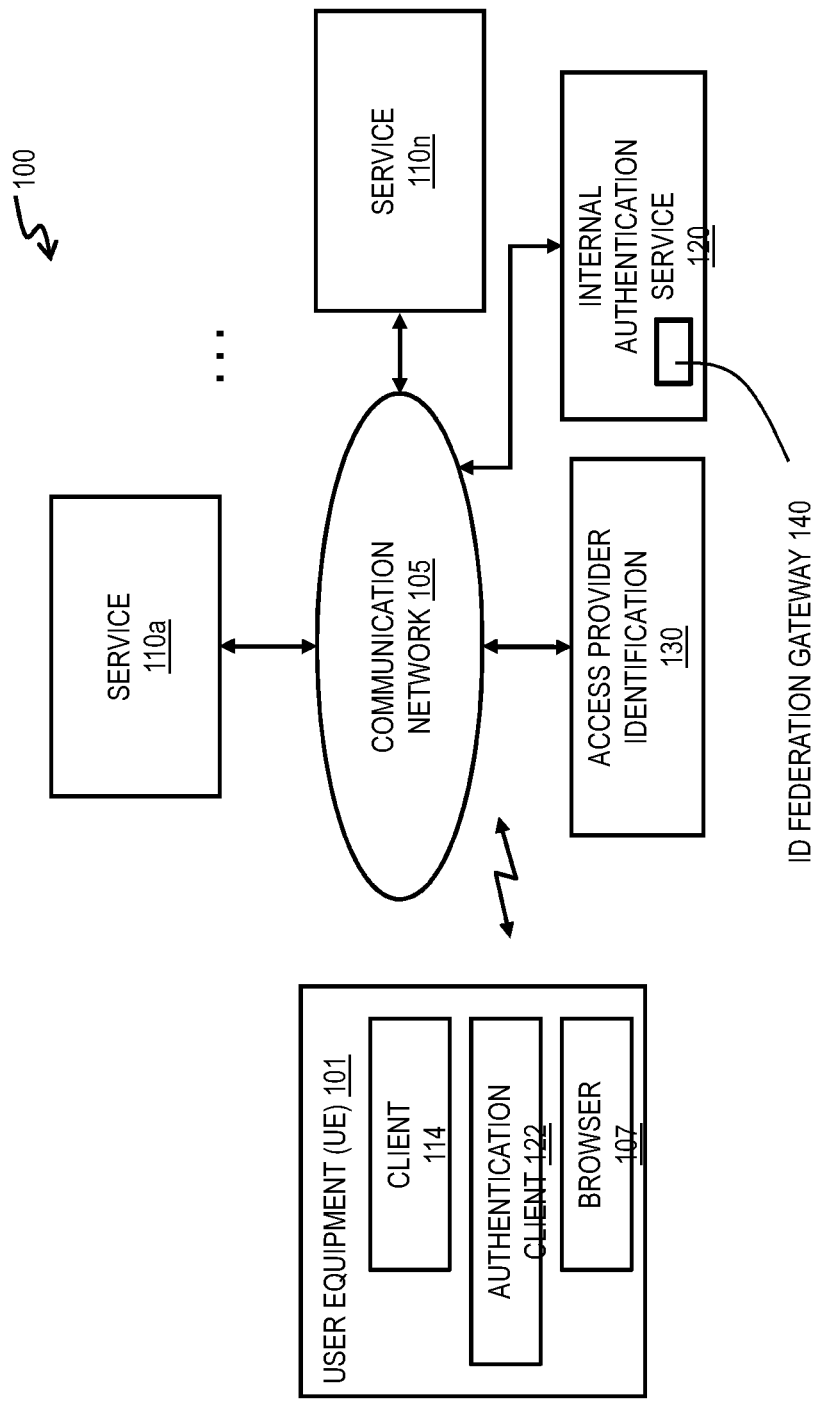

METHOD AND APPARATUS FOR IDENTITY FEDERATION GATEWAY

CROSS REFERENCE TO RELATED APPLICATION

This application is a Continuation of U.S. application Ser. No. 15/139,070, filed Apr. 26, 2016 and entitled "Method and Apparatus for Identity Federation Gateway", which is a Continuation of U.S. application Ser. No. 14/454,228 (now U.S. Pat. No. 9,325,693), filed Aug. 7, 2014 and entitled "Method and Apparatus for Identity Federation Gateway," which is a Continuation of U.S. application Ser. No. 12/708,764 (now U.S. Pat. No. 8,984,588), filed Feb. 19, 2010, and entitled "Method and Apparatus for Identity Federation Gateway," the contents of which are incorporated herein by reference in their entireties.

BACKGROUND

Network service providers and device manufacturers are continually challenged to deliver value and convenience to consumers by, for example, providing a suite of compelling network services. Subscription network services involve authenticating users during a user sign-on process. However, network resources are wasted and user experience is diminished when a user is required to sign-on several times to participate in several services available from the same network or service provider. Thus there is a move to allow a user to sign-on once and thereby gain access to several services from the same provider.

Federated identity, or the "federation" of identity, refers to technologies, standards and use-cases which serve to enable the portability of identity information across otherwise autonomous security domains, e.g., by different providers. The ultimate goal of identity federation is to enable users of one domain to securely access data or systems of another domain seamlessly, and without the need for completely redundant user administration. Changing an authentication process for one provider to a federated sign-on for multiple providers is challenging; and could involve modifying each service of each provider to use the federated procedure instead of, or in addition to, their internal authentication procedures.

SOME EXAMPLE EMBODIMENTS

Therefore, there is a need for an approach for enabling a federation of identification for systems that already provide an authentication procedure for multiple services, which does not suffer all the disadvantages of prior art approaches.

According to one embodiment, a method comprises facilitating access, including granting access rights, to an interface to allow access to a service via a network. The service comprises determining whether a user associated with a request for a particular network resource is to be identified by the provider of the particular service or by a different party. The service also comprises causing the different party to provide identification data that indicates an identity for the user if the user is to be identified by the different party. The method further comprises causing user credentials data, based on the identification data, to be sent to an authentication process of the provider for a set of one or more network resources that includes the particular network resource requested by the user, if the data indicates that the user is successfully identified.

According to another embodiment, an apparatus comprising at least one processor, and at least one memory including computer program code, the at least one memory and the computer program code configured to, with the at least one processor, cause, at least in part, the apparatus to determine whether a user associated with a request for a particular network resource is to be identified by the provider of the particular service or by a different party. The apparatus is also caused to cause the different party to provide identification data that indicates an identity for the user, if the user is to be identified by the different party. The apparatus is further caused to cause user credentials data, based on the identification data, to be sent to an authentication process of the provider for a set of one or more network resources that includes the particular network resource requested by the user, if the data indicates that the user is successfully identified.

According to another embodiment, a computer-readable storage medium carrying one or more sequences of one or more instructions which, when executed by one or more processors, cause, at least in part, an apparatus to apparatus to determine whether a user associated with a request for a particular network resource is to be identified by the provider of the particular service or by a different party. The apparatus is also caused to cause the different party to provide identification data that indicates an identity for the user, if the user is to be identified by the different party. The apparatus is further caused to cause user credentials data, based on the identification data, to be sent to an authentication process of the provider for a set of one or more network resources that includes the particular network resource requested by the user, if the data indicates that the user is successfully identified.

According to another embodiment, an apparatus comprises means for determining whether a user associated with a request for a particular network resource is to be identified by the provider of the particular service or by a different party. The apparatus also comprises means for causing the different party to provide identification data that indicates an identity for the user, if the user is to be identified by the different party. The apparatus further comprises means for causing user credentials data, based on the identification data, to be sent to an authentication process of the provider for a set of one or more network resources that includes the particular network resource requested by the user, if the data indicates that the user is successfully identified.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of providing an identifier (ID) federation gateway, according to one embodiment;

DESCRIPTION OF SOME EMBODIMENTS

Figure 2A:
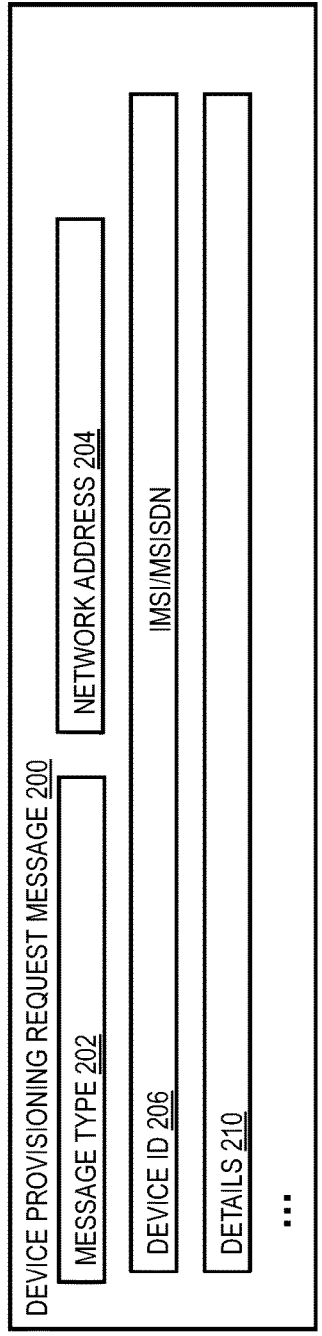
FIG. 2A is a diagram of a device provisioning request message, according to one embodiment.

Examples of a method, apparatus, and computer program for an ID federation gateway are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term network resource refers to any service or data structure or communication link available through connection to a network. A single sign-on (SSO) process refers to any process of a single provider, which enables a user, during one session connected to the network, to access a plurality of network resources from that provider without redundant entry by the user of user identification information. A single provider is often identified by a single network domain name in the uniform resource identification (URI) naming system, as used for example with a uniform resource locator (URL) naming system. An example single sign-on process is the single sign-on processes for the OVI™ system of the NOKIA CORPORATION™ of Espoo, Finland. An access provider is a network service provider that grants access for user equipment (e.g., UE 101, described below) to access a network (e.g., communication network 105, described below). As used herein, an identification process (e.g., identifying) includes determining an identity, or authenticating a particular user as having that identity, or determining that the particular user is authorized to access one or more services, or some combination.

Although various embodiments are described with respect to involving, in the SSO of a network resource provider, identification by a different network access provider, it is contemplated that the approach described herein may be used with other sets of two or more different providers and any federated identity services with legacy authentication processes, whether SSO processes or not.

FIG. 1 is a diagram of a system 100 capable of providing an ID federation gateway, according to one embodiment.

The system includes a communication network 105, user equipment 101, multiple network resources, including services 110a through 110n (collectively referenced hereinafter as network services 110) available through an internal authentication service 120 of the resource provider. Also included is an access provider identification service 130 as an example of federated identity services. For a user of UE 101 to be identified by the federated identity services, each component of the internal authentication service 120, corresponding to each service 110a through 110n, would be modified to interact with the federated identity services to obtain the user credentials. This is an error-prone process affecting many different areas of memory, and consuming processing resources as each component is modified, compiled and stored in executable form. Each update of the federated identity services would similarly be propagated to all the components of internal authentication service 120, consuming even more processing resources. If replicated on multiple hosts for safety, the consumption of processing resources and bandwidth resources are even greater. Similarly, client processes on each of many thousands of user equipment, such as cell phones, would be modified to interact with the federated identity services. These modifications consume valuable processing power, memory, battery life, and communication bandwidth that is especially scarce on mobile terminals.

FIG. 1 is a diagram of a system 100 capable of providing an ID federation gateway 140, according to one embodiment. The ID federation gateway 140 controls the interactions between the legacy authentication service and federated identity services, such as the access provider identification service 130, as well as interactions between a legacy authentication client 122 (such as a SSO device enabler (DE) process) and the service federated identity services. Thus the gateway 140 is an example means of achieving the advantage of reducing network resources to utilize federated identity services with legacy authentication service, as well as for other providers and their internal authentication services, if any (not shown). Internal authentication service 120 is a modified process that includes the legacy authentication service and the ID federation gateway 140.

As shown in FIG. 1, the system 100 comprises user equipment (UE) 101 having connectivity to internal authentication service 120 and services 110a through 110n and access provider identification service 130 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, services 110, internal authentication service 120 and access provider identification service 130 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages described by the hypertext markup language (HTML).

In the illustrated embodiment, UE 101 includes a client process 114 for at least one of the network services 110, a web browser 107 and an authentication client module 122.

Figure 7:
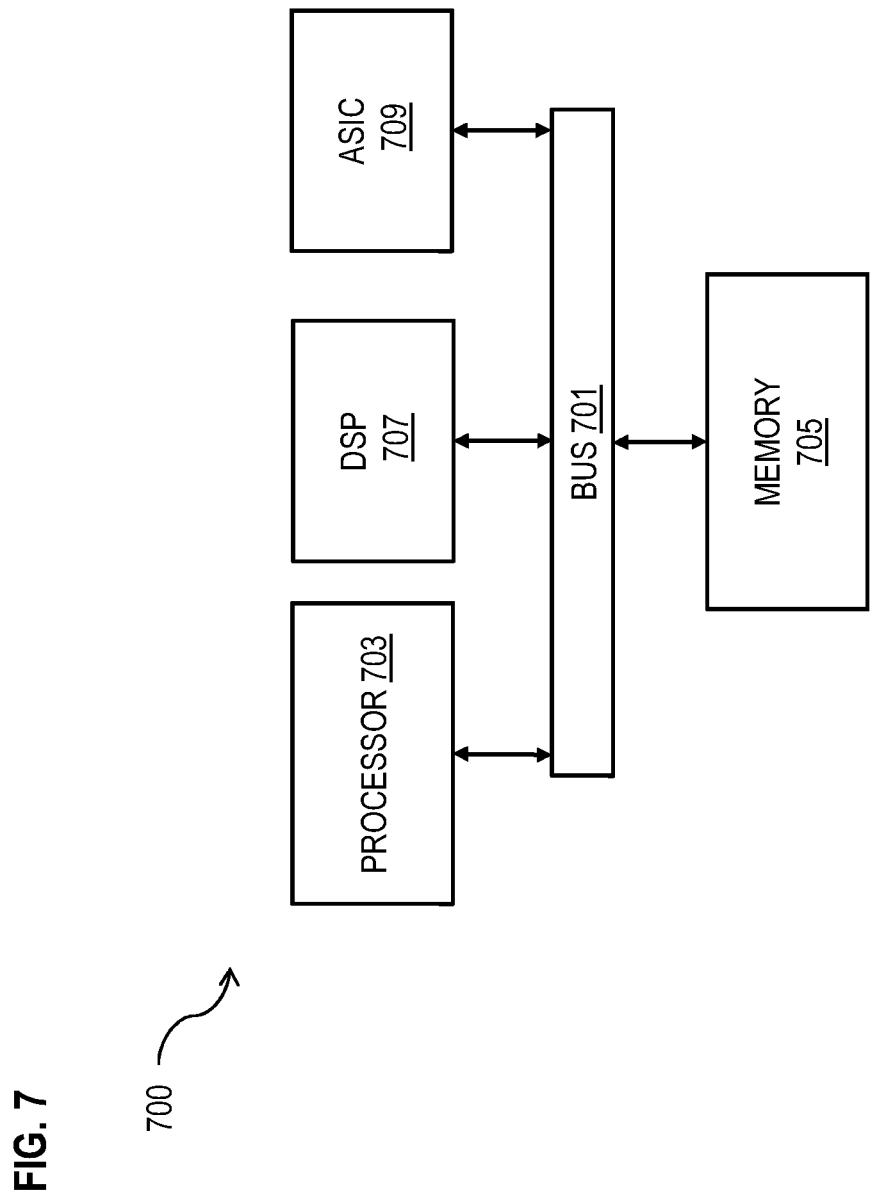
FIG. 7 is a diagram of a chip set that can be used to implement an embodiment of the invention.

The authentication client module 122 may be implemented as a chip set as shown in FIG. 7 and described below, with or without one or more computer program instructions. In the legacy authentication system, when the browser 107 or client 114 attempts to send a message requesting a service 110 of the resource provider, the authentication client module 122 intercepts the message and directs the request to the legacy authentication service. The legacy authentication service determines whether a user of the UE 101 is already signed-on during the current session with network 105. If not, a user interface (UI) is sent to the authentication client module 122 to present to the user to prompt for user inputs employed to identify the user. The UI may be included in any manner known in the art, such as a script in an HTML document delivered via HTTP. Based on those inputs, communicated from the authentication client module 122 to the legacy authentication service, the user is either accepted or rejected by the legacy authentication service. A rejection is communicated to the user through the authentication client module 122. If accepted, an authentication token is passed to the authentication client module 122 for use in further requests for other services 110 during the current session. Subsequent messages from client 114 or browser 107, requesting a network service 110 of the provider, are intercepted by the authentication client module 122 and sent to the legacy authentication service with the authentication token. If the authentication token is not out of date, the request is forwarded to the correct service 110 with whatever credentials required by the service 110 to perform the requested service. If out of date, the UI is sent by the internal authentication service 120 to the authentication client module 122 to present to the user, as described above.

By way of example, the ID federation gateway 140 includes one or more components for providing an ID federation gateway. The gateway 140 may be implemented as a chip set as shown in FIG. 7 described below, with or without one or more computer program instructions. It is contemplated that the functions of these components may be combined in one or more components or performed by other components of equivalent functionality on one or more hosts connected to network 105. The ID federation gateway 140 abstracts third party federated identity services for both services 110 (such as OVI Services) and legacy authentication service (such as OVI SSO). The ID federation gateway 140 communicates with authentication client module 122 and legacy authentication service and federated identity services using one or more messages described in FIGS. 2A through 3C.

FIG. 2A is a diagram of a device provisioning request message 200, according to one embodiment. Provisioning request message 200 includes a message type field 202, a network address field 204, a device identifier (ID) field 206 and one or more details fields 210. The message type field 202 hold data that indicates the message is a device provisioning request message sent by the authentication client module 122 to determine how to deal with user identification processes. The network address field 204 holds data that indicates the network address of the authentication client module 122, to which a response to the request should be sent.

The device ID field 206 holds data that uniquely indicates user equipment, such as a Mobile Subscriber Integrated Services Digital Network Number (MSISDN, which is a cell telephone number) or some other identifier defined by an access provider, such as an International Mobile Subscriber Identity (IMSI) identifier, a unique 15-digit code used to identify an individual user on a global system for mobile communications (GSM) network. These options are indicated by the symbols "IMS/MSISDN" in field 206. An IMSI value is typically stored on a Subscriber Identity Module (SIM card), a device used to store information in many mobile phones, especially for advanced features. While the IMSI indicates a user who is supposed to control a mobile UE, it is not a guarantee that the correct user is actually in control of the mobile UE. Thus user authentication, e.g., involving entry of a password, is still desirable during identification.

The details field 210 holds further details about the UE or user, such as features available on the UE like operating system, applications such as global positioning system (GPS), and Bluetooth capabilities, among many others well known in the art. In some embodiments, field 210 is omitted.

In some embodiments, authentication client module 122 uses request message 200 to request identity provisioning data from a network component, when UE 101 is powered up. In some embodiments, the authentication client module 122 includes detailed information in details field 210 in the provisioning request message 200 in order to fine grain data returned by a provisioning service.

Figure 2B:
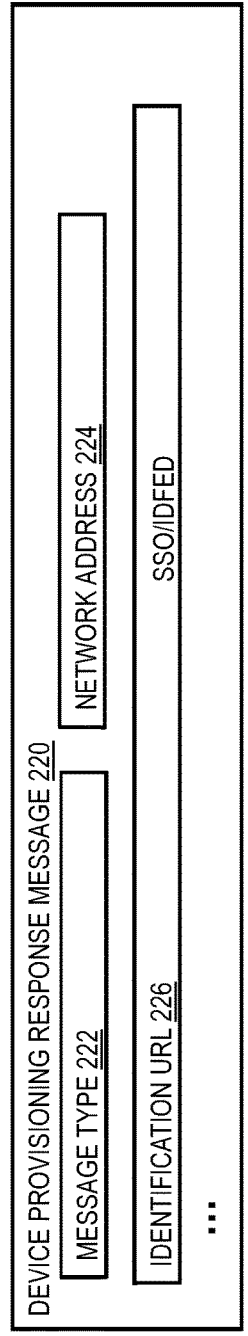
FIG. 2B is a diagram of a device provisioning response message, according to one embodiment.

FIG. 2B is a diagram of a device provisioning response message 220, according to one embodiment. Device provisioning response message 220 includes a message type field 222, a network address field 224 and an identification URL field 226. The message type field 222 holds data that indicates the message is a device provisioning response message sent to the authentication client module 122 by the ID federation gateway 140 to indicate how to deal with user identification. The network address field 224 holds data that indicates the network address of the ID federation gateway 140.

The identification URL field 226 holds data that indicates a service and service parameters to use when a user attempts to obtain a network resource that involves user identification. A URL with associated parameters is easily sent in an HTTP message used by browser 107 and many clients of services 110, such as client 114. In some embodiments, at least one parameter for the URL in field 226 indicates whether the user of the user equipment is to be identified employing the legacy authentication service 9 such as an SSO service) or with the federated identity service, such as indicated by the symbols "SSO/IDFED" in field 226.

In some embodiments, provisioning data is pushed to authentication client module 122 on a mobile terminal, for example in a device provisioning response message 220 sent automatically to every mobile terminal that connects to a network, such as communications network 105, e.g., based on an MSISDN value presented during communication, without requiring a device provisioning request message 200.

Figure 2C:
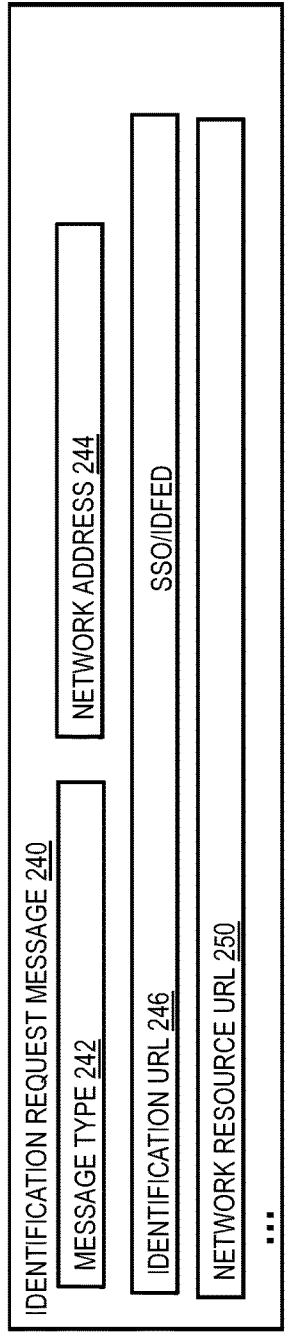
FIG. 2C is a diagram of an identity authentication request message for a network resource, according to one embodiment.

When the authentication client module 122 detects a request for a resource of a resource provider, an authentication request message is sent to the URL with parameters provided in field 226. FIG. 2C is a diagram of an identification request message 240 for a network resource, according to one embodiment. Identification request message 240 includes a message type field 242, a network address field 244, an identification URL field 246 and one or more network resource URL fields 250. The message type field 242 holds data that indicates the message is an identification request message sent by the authentication client module 122. The network address field 224 holds data that indicates the network address of the authentication client module 122. The identification URL field 246 holds the data provided in field 226 with any parameters, such as the indication whether the authentication is done by the legacy authentication service or the federated identity service, e.g., access provider identification service 130.

The network resource URL field 250 holds data that indicates the network resource, e.g., service 110, for which the user desires to sign on.

Figure 3A:
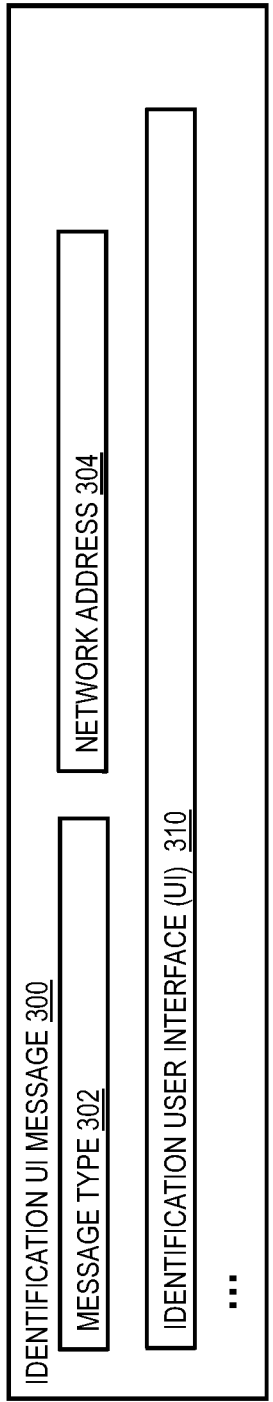
FIG. 3A is a diagram of an authentication user interface (UI) message, according to one embodiment.

In various embodiments, the ID federation gateway 140 prompts the user for input, such as user name and password, to determine whether a user of UE 101 is authentically a particular user registered with one or more network resources. The prompts are presented on the UE 101 in one or more user interfaces (UIs). FIG. 3A is a diagram of an identification user interface (UI) message 300, according to one embodiment. The identification UI message 300 includes a message type field 302, a network address field 304 and an identification UI field 310. The message type field 302 holds data that indicates the message is an identification UI message sent to the authentication client module 122. The network address field 304 holds data that indicates the network address of sending process, e.g., ID federation gateway 140.

The identification UI field 310 holds data that indicates the UI to be presented to the user, e.g., the user of UE 101. In some embodiments, the identification UI field 310 includes data that is to be presented to the user, such as script for a form in an HTML document sent via HTTP, as is well known in the art. In some embodiments, the identification UI field 310 includes data that redirects a client to the federated identity service, such as access provider identification service 130. Any method may be used to cause the client process to be redirected, such as a redirect URL in an HTML document sent via HTTP to client 114 or browser 107, as is well known in the art. The URL includes one or more parameters that cause the federated identity service to present an identification UI at the user equipment. The user inputs to the UI are returned to the federated identity service. In some embodiments, the redirect URL in the identification UI field 310 includes data that causes the response from the federated identity service to be sent to the ID federation gateway 140, either directly or indirectly by a redirect in a response sent from the federated ID service to the user equipment.

Figure 3B:
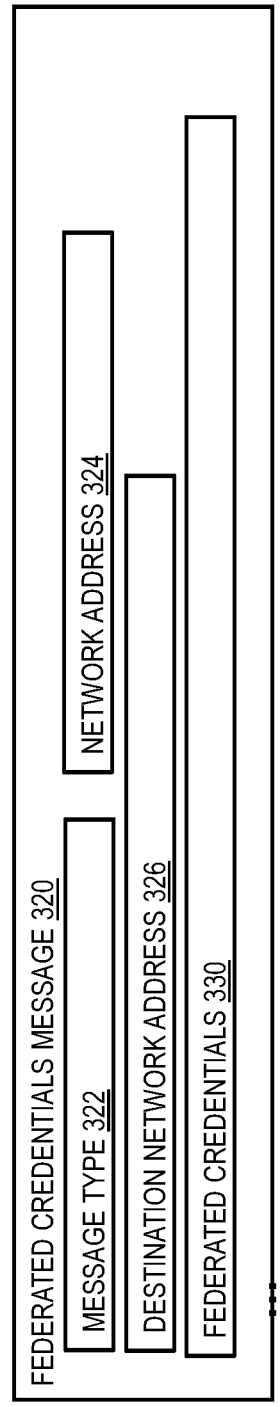
FIG. 3B is a diagram of a user credentials message, according to one embodiment.

As a result of receiving user input prompted by the identification UI, the federated identity service determines whether the user is successfully identified or not; and returns the result in a federated credentials message. FIG. 3B is a diagram of a federated credentials message 320, according to one embodiment. The federated credentials message 320 includes a message type field 322, a network address field 324, a destination network address field 326 and a federated credentials field 330. The message type field 322 holds data that indicates the message is a federated credentials message sent by the federated identity service. The network address field 324 holds data that indicates the network address of sending process, e.g., federated identity service such as access provider identification service 130. The destination network address field 326 holds data that indicates the network address of the destination. In some embodiments, the destination is a URL for the browser 107 or client 114 with a redirect to the ID federation gateway 140. In some embodiments, the destination is a URL for the ID federation gateway 140 directly.

The federated credentials field 330 holds data that indicates the result from the federated identity services authentication process. If authentication failed, the result is a failure code indicating a reason for failure (e.g., unknown user name, incorrect password, negative account balance, among others). If authentication succeeded, the result is a token that indicates the user (and in some embodiments other data such as time) with some security code, such as a digital signature, that can be checked using a shared secret or public key for the federated identity service, as is well known in the art. The security code indicates that the token indeed came from the federated identity service. The user is indicated by a code that is shared among all members of the ID federation, including the provider of services 110. Thus, successful authentication by third party federated identity service, e.g., access provider identification service 130, redirects authentication client module 122 back to ID federation gateway 140 with proof of successful authentication (token).

Figure 3C:
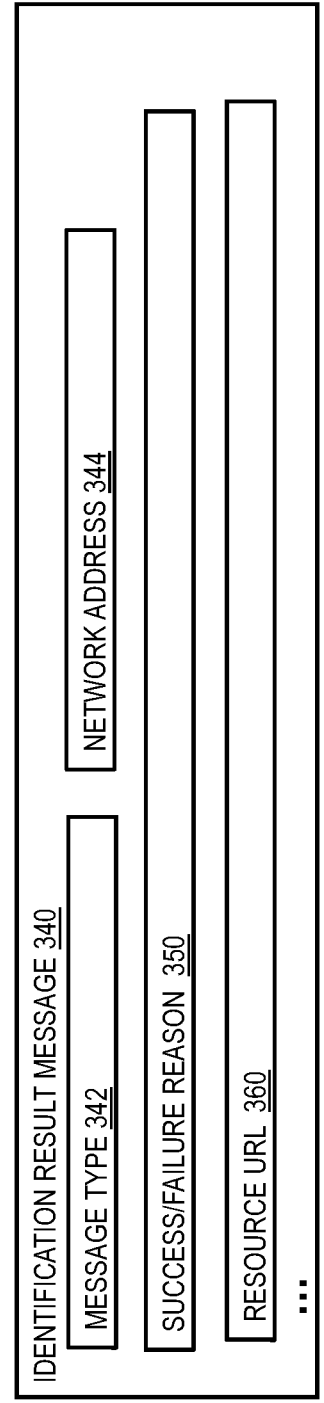
FIG. 3C is a diagram of an identity authentication result message, according to one embodiment.

After the ID federation gateway 140 receives the federated credential message 320 and exchanges messages with the legacy authentication service based on the federated credentials, the gateway 140 sends an authentication result message to the user, e.g., to the authentication client 122 which presents the result to the user. FIG. 3C is a diagram of an identification result message 340, according to one embodiment. The identification result message 340 includes a message type field 342, a network address field 344, a success/failure reason field 350, and a resource URL field 360. The message type field 342 holds data that indicates the message is an identification result message sent by the ID federation gateway 140. The network address field 324 holds data that indicates the network address of the sending process, e.g., ID federation gateway 140.

The success failure reason field 350 holds data that indicates the result from the identification process. If identification failed, the result is a failure code indicating a reason for failure (e.g., unknown user name, incorrect password, negative account balance, among others). If identification succeeded, the data indicates success. In some embodiments, if identification is successful, then the field 350 includes a token from the legacy authentication system.

The resource URL field 360 holds data that indicates the URL of the resource with any parameters, including any parameters granting access such as an authentication token, if the result in field 350 indicates a success. Otherwise, the field 360 is empty or omitted.

Although messages in FIG. 2A through FIG. 3C are shown as integral blocks with particular fields in a particular order for purposes of illustration, in other embodiments one or more fields or portions thereof occur in a different order in one or more messages, or are omitted, or one or more fields are added or the message is changed in some combination of ways. For example, in some embodiments, the message type fields and network address fields are included in one or more header portions of one or more protocols used to deliver the message through the network, e.g., through communications network 105.

Figure 4:
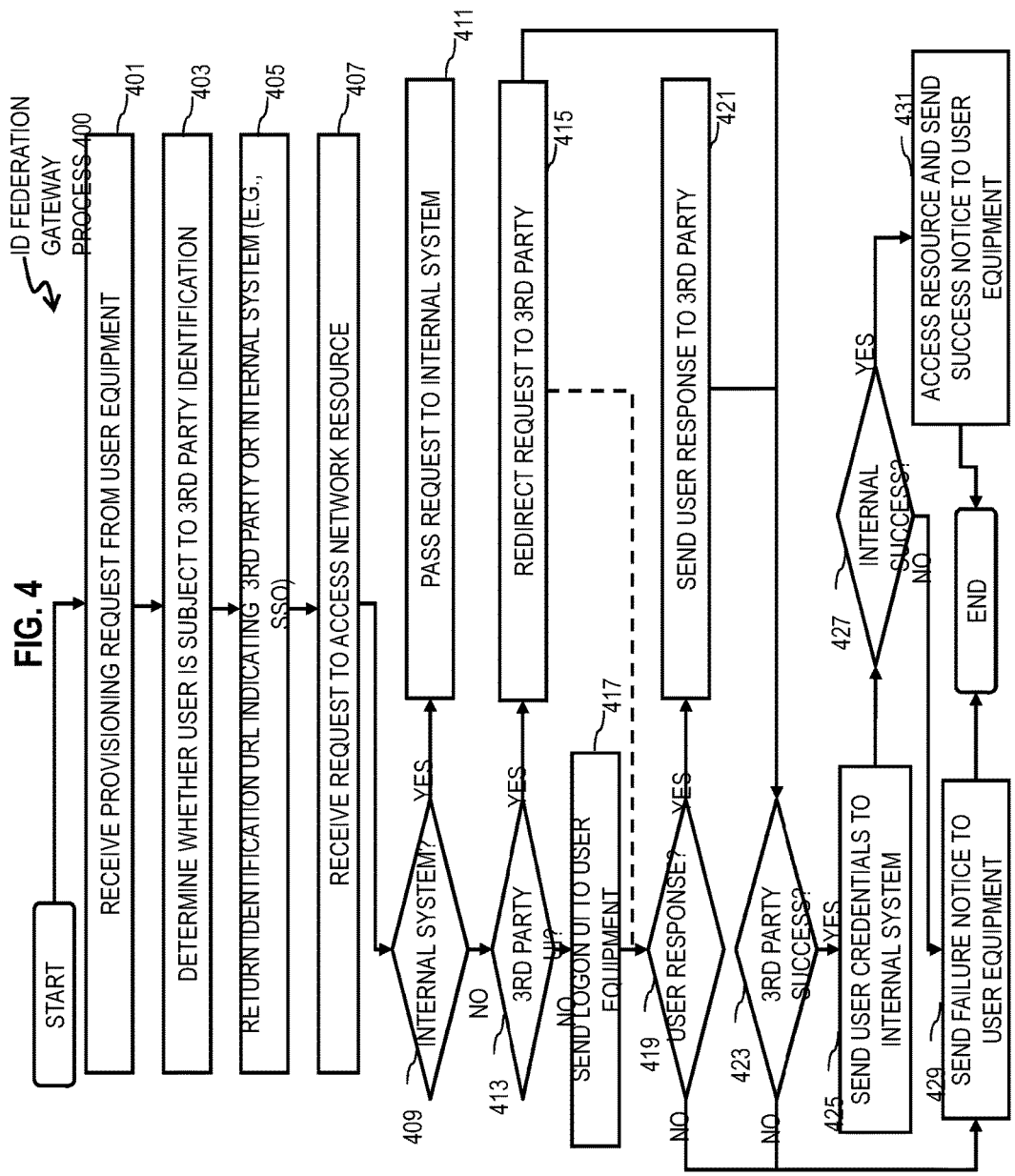
FIG. 4 is a flowchart of a process for an identifier (ID) federation gateway, according to one embodiment.
Figure 6:
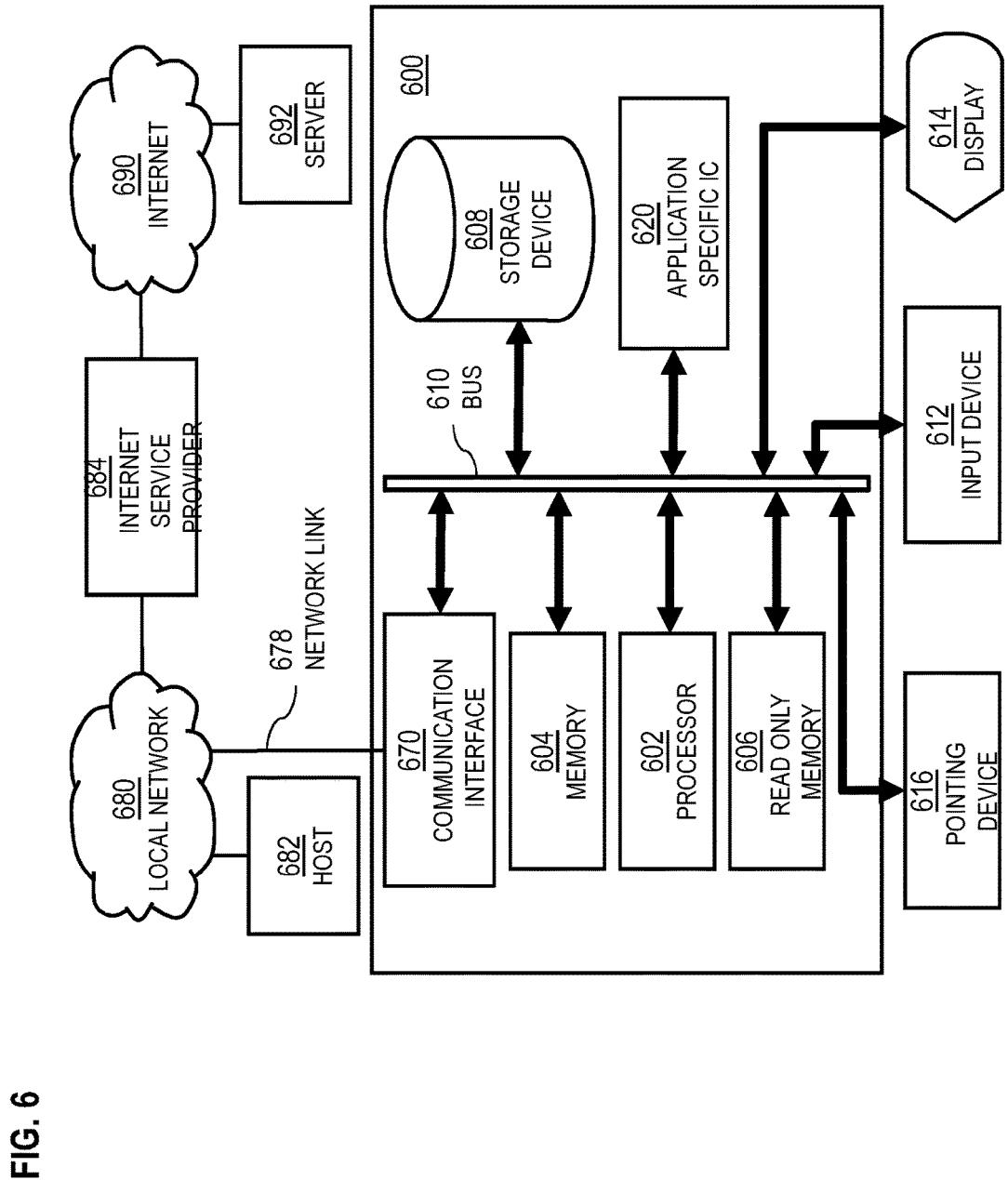
FIG. 6 is a diagram of hardware that can be used to implement an embodiment of the invention.

FIG. 4 is a flowchart of a process 400 for an identifier (ID) federation gateway 140, according to one embodiment. In one embodiment, the ID federation gateway 140 is implemented in, for instance, a chip set including a processor and a memory as shown FIG. 7, or a general purpose computer as shown in FIG. 6. In some embodiments, the process 400 is performed by a remote server, and a method comprises facilitating access, including granting access rights, to an interface to allow access to a service of the remote server via a network. Although steps are shown in flowcharts such as FIG. 4 as integral blocks in a particular order for purposes of illustration, in other embodiments one or more steps or portions thereof are performed in a different order or overlapping in time, in series or parallel, or are omitted or one or more steps are added, or the method is changed in some combination of ways.

In step 401, a provisioning request is received from user equipment to determine how to perform identification for a user of the equipment. For example, a request for provisioning data from a network component is sent as message 200 by the authentication client module 122 on UE 101 to the legacy authentication service and intercepted by the ID federation gateway 140 executing on the same host with the legacy authentication service. Thus, an initial message directed to the single sign-on process of the provider is caused to be diverted away from the single sign-on process to the gateway 140 during step 401. In some embodiments, an initial request for one of the network resources offered by the network resource provider, e.g., an initial request for one or more of services 110, serves as the provisioning request received in step 401. In some embodiments, step 401 determines when the user equipment connects to the network.

In step 403, it is determined whether the user equipment is subject to identification by a federated identity service or not. Any method may be used to determine this, such as parsing the initial message 200 to determine the user equipment indicated in device ID field 206. For example, the contents of the device ID field 206, such as a MSISDN value, are compared to a network database that indicates the access provider for the user equipment. If the access provider is a member of an identity federation, then the federated identity service for the access provider is determined. Thus, in some embodiments, a database is used for determining user equipment associated with identification by the different party, e.g., by the federated identity service. If not, and there is no other member of an identity federation associated with the device ID data in field 206, then it is determined to use the internal authentication service to identify and authenticate the user. Thus step 403 determines whether a user associated with a request for a particular network resource is to be identified by the provider of the particular service or by a different party. This provides the advantage of abstracting the third party interactions out of the legacy system, such as the legacy authentication service and the services 110. This abstraction provides the advantage of reducing the computational resources to update and integrate the third party interactions into the legacy authentication service and services 110. Step 403 is an example means of achieving this advantage.

In step 405 a device provisioning response message, such as message 220, is sent to the user equipment, e.g., to the authentication client module 122 on UE 101. The response message includes data that indicates the identification process determined in step 403, e.g., inserted in field 226. For example, the URL of the ID federation gateway 140 with at least one parameter is inserted into identification URL field 226 of message 220. The at least one parameter indicates legacy authentication service if there is no federated identity service. The parameter indicates the federated identity service if there is one, as determined in step 403. In some embodiments, the URL of the authentication service is inserted into field 226 if there is no federated identity service; and the URL of the ID federation gateway 140 with a parameter indicating the federated identity service is inserted into field 226 if there is a federated identity service. This further abstracts the third party interactions and achieves the advantage of reducing the computational resources to update and integrate the third party interactions into the legacy authentication service and services 110. Step 405 is an example means of achieving this advantage. Thus, if the user equipment connects to the network, then provisioning data that indicates the different party is caused to be sent to the user equipment. By sending the provisioning message to the authentication client 122, the provisioning data is included in the request for the particular service, as described in more detail below.

In step 407 a request is received from user equipment to access a network resource that involves a user identity, e.g., one or more of services 110. For example, identification request message 240 is received indicating the network resource to be accessed in field 250 and the identification URL in field 246. The data in field 246 indicates whether identification is to be done using an internal system, such as the legacy SSO, or a federated identity service, such as access provider identification service 130.

In step 409 it is determined whether an internal authentication system is to be used, such as legacy SSO service. For example, this determination is made based on the contents of field 246. If so, then in step 411 the request for access is passed to the internal system, e.g., the legacy SSO service, as described above with reference to FIG. 1. If not, then a third party, i.e., a federated identity service, is to identify a user; and control passes to step 413. Thus step 409 is a means for causing the different party to provide identification data that indicates an identity for the user, if the user is to be identified by the different party. This further abstracts the third party interactions and achieves the advantage of reducing the computational resources to update and integrate the third party interactions into the internal authentication service and network services 110. Step 409 is an example means of achieving this advantage In step 413, it is determined whether the identification user interface (UI) is to be provided by the third party, i.e., the federated identity service. If so, then in step 415, the process on the user equipment, e.g., authentication client module 122, is redirected to the third party. For example, message 300 is sent to the user equipment with a redirect to the federated identity service in field 310. In some embodiments, the redirect includes data so that the response is redirected to the ID federation gateway 140, as described below. Thus, in some embodiments, step 415 includes forming a redirected request that is redirected to the different party and includes a separate redirect of a response from the different party to the service; and causing the redirected request to be sent to the user equipment.

Furthermore, step 415 is an example means for causing a different party from the resource provider to provide identification data that indicates an identity for the user. Step 415 achieves the advantage of using the third party identification without changing the legacy internal authentication service or services 110, thus saving computational resources on the hosts of those services. This also achieves the advantage of using the UI provided by the third party, thus saving computational resources on the legacy authentication service. Thus steps 413 and 415 are example means for achieving this additional advantage.

If it is determined in step 413 that the third party does not provide the UI, then in step 417, an identification UI, also called a logon UI for convenience hereinafter, is sent to the user equipment. For example, message 300 is sent to the user equipment with a script for the logon UI in field 310. Thus step 417 includes causing to be sent, to the user equipment, a user interface that presents prompts for input from a user for the different party to identify the user.

In step 419 it is determined whether a response is received from the user equipment with user input. If no response is received within a reasonable time, e.g., within five minutes, then logon fails and control passes to step 429. In some embodiments, step 415 returns only a user response to the UI sent by the third party and not an identification result, such as a token or failure code. In such embodiments, the user responses from step 415 are returned to step 419, as indicated by the dashed arrow.

In step 429 a failure notice is sent to the user equipment. The failure reason is presented on a display of the user equipment, e.g. on a display of UE 101 by authentication client module 122; and the process ends. For example, message 340 is sent to authentication client module 122 with data in field 350 indicating a failure for lack of user input.

If it is determined, in step 419, that a response is received from the user equipment with user input within an appropriate time, then in step 421 data indicating the user response is sent to the third party, i.e., to the appropriate federated identity service. Thus step 421 includes causing to be sent, to the different party, data based on user responses to the prompts of the user interface. This is one means for causing the different party to provide identification data that indicates an identity for the user and achieves the advantage of using the federated identity service without changing the rest of the legacy authentication service. In some embodiments, this takes place offline e.g. by utilizing digital signatures (which involves a trusted relationship between the ID federation gateway 140 and the federated identity service, e.g., access provider identification service 130).

In step 423, it is determined whether the third party has successfully identified the user. For example, as a result of step 415 or 421, the user credential message 320 is received at the gateway 140 from the third party. Thus step 423 includes receiving identification data in response to step 415 (sending to the user equipment a redirected request that is redirected to the different party); and receiving the identification data in response to step 421 (sending to the different party the data based on user responses to the prompts of the user interface). The message 320 is parsed to determine whether identification information, such as field 330, indicates a valid token. If field 330 does not include a valid token, then user identification is a failure; and control passes to step 429, described above. In step 429, data in field 350 indicates a failure code for an invalid token or other failure code from field 330, and is sent to the user equipment for presentation to a user.

If it is determined, in step 423, that the user is successfully identified by the third party, then, in step 425, data indicating the user credentials based on the valid token are sent to the internal system, e.g., the legacy SSO service. The user credentials are based on the identification information sent by the third party in field 330 of message 320. Thus, if the data indicates that the user is successfully identified, then user credentials data based on the identification data are caused to be sent to an authentication process, such as a single sign-on process, of the provider. This provides the advantage of using the legacy authentication or SSO service when no federated identity service is available so that redundant processing is avoided for signing on to any or all of the services 110 of the network resource provider.

In step 427, it is determined whether the user is successfully signed on to the legacy authentication system, e.g., SSO service. The valid token provided by the third party service might not indicate a registered user of the services 110 provided by the network resource provider, e.g., OVI. The result of the internal system is provided as a returned call parameter in an application programming interface (API) or a client-server message, such as an HTTP message. In some embodiments, successful identification on the legacy SSO returns an SSO token. If it is determined in step 427 that the user is not successfully signed on to the internal system, then control passes back to step 429 to send to the user equipment a failure notice with the reason for failure, as described above.

If it is determined in step 427 that the user is successfully signed on to the internal system, then in step 431 access is granted to the network resource, such as one or more of services 110, and a notice of success is sent to the user equipment. Thus the ID federation gateway 140 utilizes core authentication service to create a transparent system wide authentication context with an authentication token. In some embodiments, the notice of success is a message sent to authentication client module 122 for presentation on a display of user equipment, such as UE 101. In some embodiments, the notice of success is an opening page of the network resource, such as a home Web page of service 110 sent as an HTML document in an HTTP message.

Figure 5:
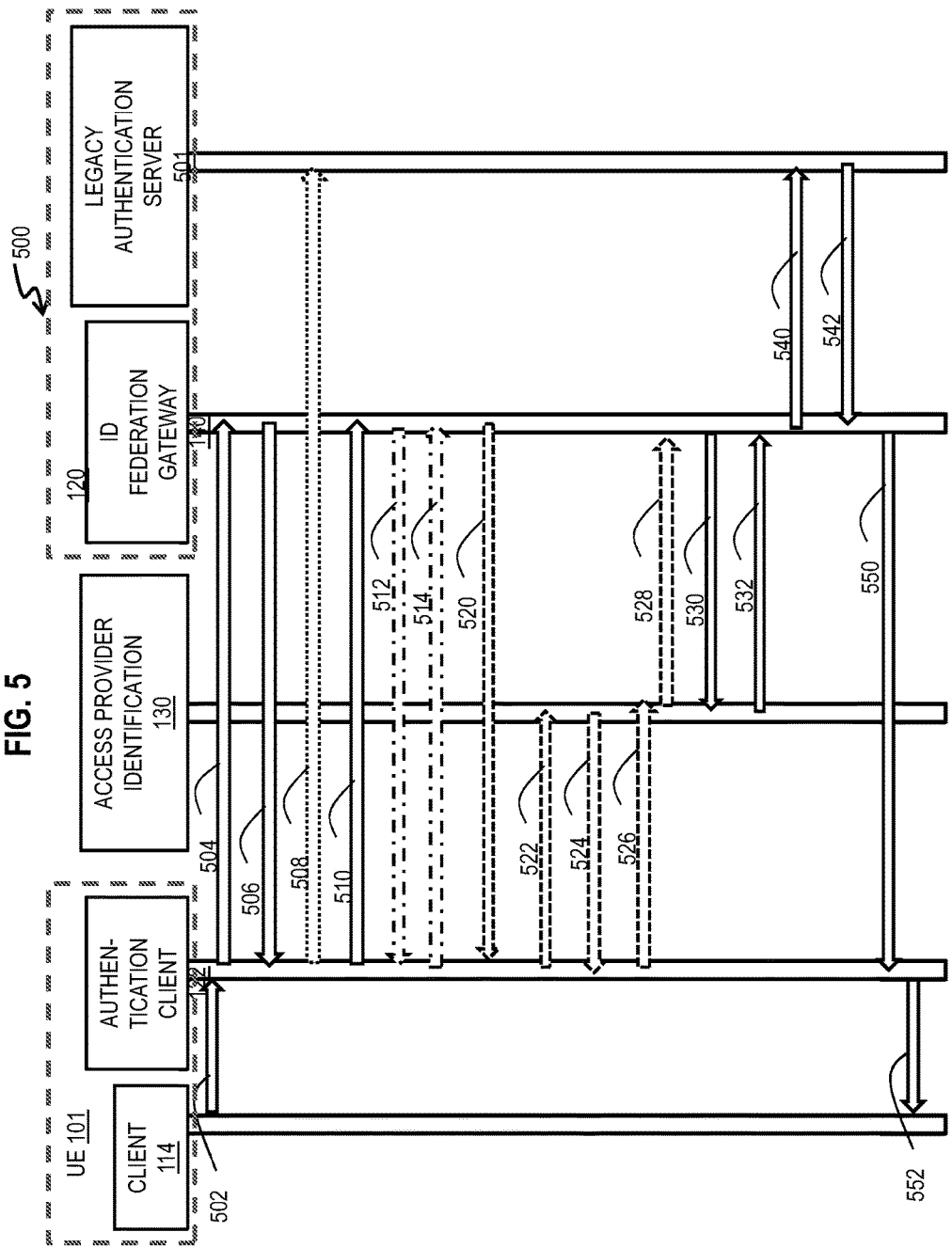
FIG. 5 is a time sequence diagram that illustrates a sequence of messages and processes for an ID federation gateway, according to various embodiments.

FIG. 5 is a time sequence diagram that illustrates a sequence of messages and processes for an ID federation gateway, according to various embodiments. A network process on the network is represented by a thin vertical box, labeled at the top. A message passed from one process to another is represented by horizontal arrows. A step performed by a process is indicated by a box or looping arrow overlapping the process at a time sequence indicated by the vertical position of the box or looping arrow.

The processes represented in FIG. 5 are services client 114 and authentication client module 122 in UE 101, an access provider identification service 130 (as an example federated identity service), and an internal authentication service 120 comprising an ID federation gateway 140 and a legacy authentication service 501 (such as a legacy SSO).

A request message 502 is sent from client 114 (or browser 107) to access a resource, such as service 110, from a network resource provider. The authentication client 122 intercepts the request message to direct it to an appropriate user identification process. To determine the appropriate identification process for the UE 101, the authentication client 122 sends a provisioning message 504, such as message 200, to a default network component, such as internal authentication service 120. The provisioning message identifies the UE 101 with as much detail as possible, such as with a MSISDN or IMSI or both. This message is intercepted by the ID federation gateway 140 to avoid modifications to the legacy authentication server 501.

The gateway 140 determines the appropriate identification process as described above with reference to step 403 in FIG. 4. The gateway 140 then sends a response message 506, such as message 220, that indicates the appropriated identification process, e.g., in identification URL field 226. The message is sent to UE 101 where it is received by authentication client 122.

In some embodiments, messages 504 and 506 are exchanged upon powering up UE 101, before message 502 is sent. In some embodiments, message 506 is pushed to UE 101 without waiting for request message 504.

Based on provisioning data and device information, authentication client 122 determines which identification process destination to send the request for service, either service request message 508 (such as message 240) directed to the legacy authentication 501, or request message 510 (such as message 240) directed to the ID federation gateway 140. The legacy authentication server operates in response to message 508 and is not described further herein. To indicate that the sequence associated with message 508 is not followed, the arrow representing message 508 is dotted.

In response to message 510, the ID federation gateway 140 sends an identification user interface (UI) to the client prompting user input, such as password or username and password or some other user input, for identifying the user. The UI is sent in an identification UI message 300. As described above, the identification UI message includes the UI, e.g., as a HTML script for presenting a form, in some embodiments, and includes the redirect to the federated identity service in other embodiments. The former embodiments include message 512 and 51 represented by dash-dot arrows; the latter embodiments include messages 520, 522, 524, 526 and 528 represented by dashed arrows, instead.

In the former embodiments, the ID federation gateway 140 is configured to present a UI to obtain the user inputs for the federated identity service, such as service 130. The message 512, such as identification UI message 300, includes in field 310 a UI that is associated with gateway 140. The UI may be included in any manner known in the art, such as a script in an HTML document delivered via HTTP. The UI in field 310 is directly presented on UE 101 by authentication client 122. User responses are returned in one or more messages 514.

In the latter embodiments, the ID federation gateway 140 is configured to redirect the user equipment to the federated identity service, such as service 130, which provides a UI to obtain user inputs, as described above with reference to step 415 in FIG. 4. The message 520, such as identification UI message 300, includes in field 310 a redirect that is associated with gateway 140. The redirect may be included in any manner known in the art, such as URL with one or more parameters. In an illustrated embodiment, the parameters redirect the UI response to the gateway 140. The authentication client 122 is redirected to the federated identity service, such as service 130, in message 522. A UI is sent from the federated identity service to the authentication client 122 in message 524 and presented on UE 101 by authentication client 122. User inputs are returned to the federated identity service in one or more messages 526 and redirected to the ID federation gateway 140 in message 528. In some embodiments, message 528 includes the identification information results produced by the service 130, such as a failure code or token indicating user credentials.

In response to user inputs received in message 514, or in message 528 when authentication results are not also available in message 528, the ID federation gateway 140 sends data indicating the user responses to the federated identity service, such as service 130, as described above with reference to step 421 in FIG. 4. In response to sending message 530, the federated identity service, such as service 130, sends identification results in message 532, such as user credential message 320. In some embodiments, message 528 includes an identification result; and messages 530 and 532 are omitted.

If the message 532 (or 528) includes a valid token, e.g., in user credential field 330, then user credentials for the legacy authentication service based on the valid token are sent to the legacy authentication service 501 in message 540. If the user credentials are deemed valid by the legacy authentication service 501, then the client 114 has gained access to one or more of the services 110. If not, then a failure condition has occurred. The response message 542 from the legacy authentication service 501 indicates the results, e.g., in field 350 of identification result message 340, as success or failure code. In some embodiments, if the result at the legacy authentication service 501 is a success, the message 542 includes the authentication token. Consequently, the ID federation gateway 140 is considered a trusted service; and service wide authentication context is created. In some embodiments, if the result at the legacy authentication service 501 is a success, the message 542 includes a URL with parameters that redirects the client 114 to the network resource, such as service 110, e.g., in field 360 with any credentials as parameters in the field.

At least some data from results message 542 are included in a message 550 from the ID federation gateway 140 to the authentication client 122, and thence to the client 114 (or browser 107) in message 552. In various embodiments, messages 542, 550, 552 are of the form of authentication results message 340.

Subsequent requests from browser 107 or clients of other services from the same user equipment during the same connection session with the network 105 are not presented with an identification UI, because both federated and authentication tokens are already available for this equipment at ID federation gateway 140.

The processes described herein for providing an ID federation gateway may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to an ID federation gateway as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of an ID federation gateway.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to an ID federation gateway. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for an ID federation gateway. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for an ID federation gateway, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for an ID federation gateway to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set 700 upon which an embodiment of the invention may be implemented. Chip set 700 is programmed as an ID federation gateway as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of an ID federation gateway.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein for an ID federation gateway. The memory 705 also stores the data associated with or generated by the execution of the inventive steps.

Figure 8:
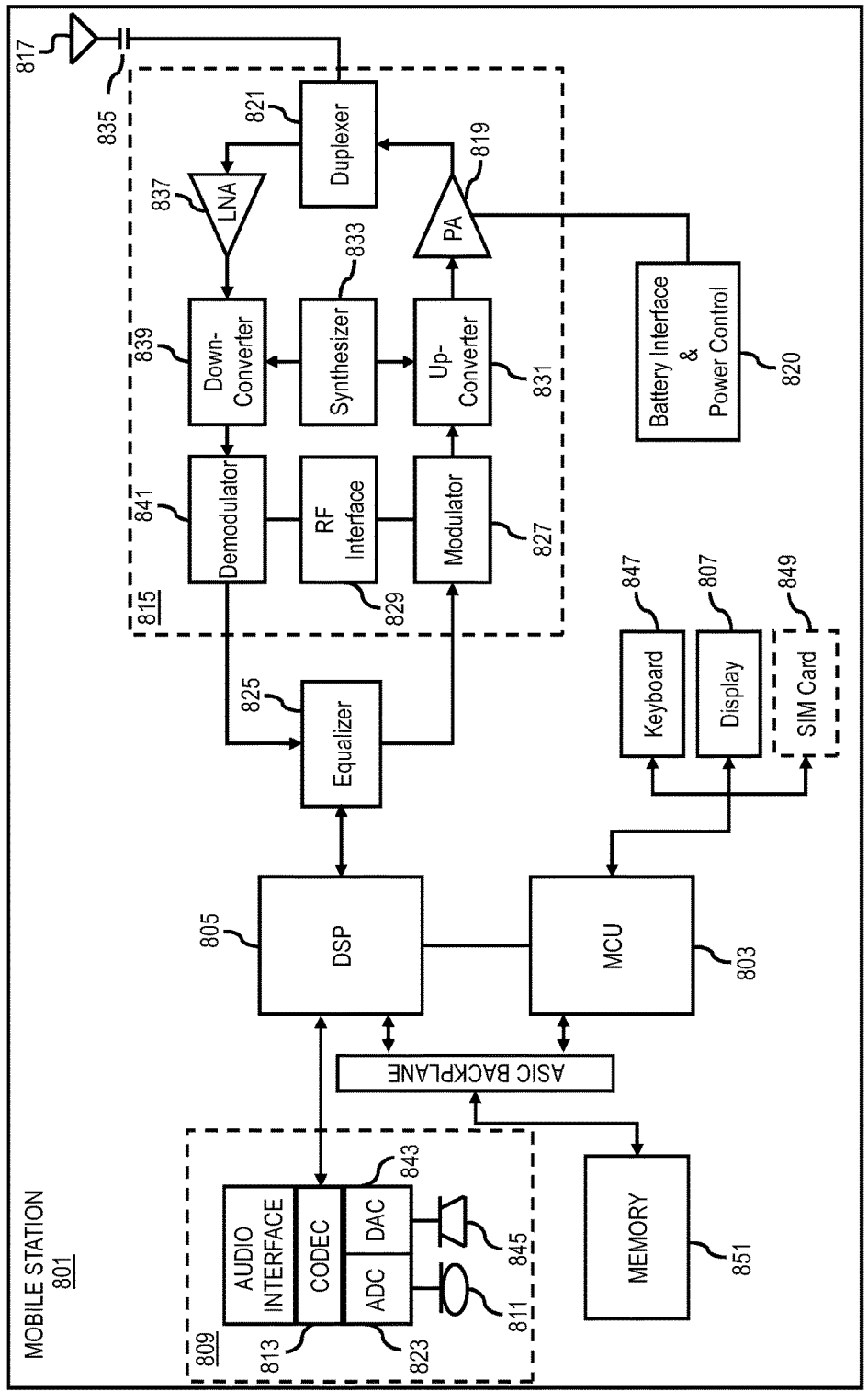
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of an ID federation gateway. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of an ID federation gateway. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs user interface software to facilitate user control of at least some functions of the mobile terminal 801 for an ID federation gateway. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   sending a provisioning message from a user device over a communication network in response to a request at the user device to access a legacy authentication service of a network resource,
   wherein the provisioning message includes a request to determine whether to use the legacy authentication service of the network resource or a federated identity service to identify the user device
   when the user device is to be identified by the federated identity service, sending a service request message to access the network resource, from the user device, over the communication network, to an identifier federation gateway;
   receiving an identification message at the user device from the from the identifier federation gateway with a redirect instruction to the federated identity service when the user device is to be identified by the federated identity service;

sending identification data that indicates an identity for the user device to the federated identity service; and receiving an authentication results message from the legacy authentication service via the identifier federation gateway, wherein the authentication results message includes an indication that the user device is successfully identified by the federated identity service.

2. A method of claim 1, wherein the authentication results message indicates a success or failure of identification of the user device.

3. A method of claim 2, wherein the authentication results message includes an authentication token when there is a successful identification of the user device.

4. A method of claim 1, wherein the authentication results message includes an authentication token when there is a successful identification of the user device.

5. A method of claim 4, wherein the authentication results message includes a URL with parameters that redirects the user device to the network resource.

6. A method of claim 1, wherein the authentication results message includes a URL with parameters that redirects the user device to the network resource.

7. A method of claim 6, wherein the provisioning message further comprises a user device identifier.

8. A method of claim 1, wherein the provisioning message further comprises a user device identifier.

9. An apparatus comprising:
at least one processor; and
at least one memory including computer program code, the at least one memory and the computer program code configured to, with the at least one processor, cause the apparatus to perform at least the following:
send a provisioning message from a user device over a communication network in response to a request at the user device to access a legacy authentication service of a network resource,
wherein the provisioning message includes a request to determine whether to use the legacy authentication service of the network resource or a federated identity service to identify the user device
when the user device is to be identified by the federated identity service, sending a service request message to access the network resource, form the user device, over the communication network, to an identifier federation gateway;
receive an identification message at the user device from the identifier federation gateway with a redirect instruction to the federated identity service when the user device is to be identified by the federated identity service;
receive an authentication results message from the legacy authentication service via the identifier federation gateway,
wherein the authentication results message includes an indication that the user device is successfully identified by the federated identity service.

10. An apparatus of claim 9, wherein the authentication results message indicates a success or failure of identification of the user device.

11. An apparatus of claim 10, wherein the authentication results message includes an authentication token when there is a successful identification of the user device.

12. An apparatus of claim 9, wherein the authentication results message includes an authentication token when there is a successful identification of the user device.

13. An apparatus of claim 12, wherein the authentication results message includes a URL with parameters that redirects the user device to the network resource.

14. An apparatus of claim 9, wherein the authentication results message includes a URL with parameters that redirects the user device to the network resource.

15. A method of claim 9, wherein the provisioning message further comprises a user device identifier.

16. A non-transitory computer-readable storage medium carrying one or more sequences of one or more instructions which, when executed by one or more processors, cause an apparatus to at least perform the following steps:
sending a provisioning message from a user device over a communication network in response to a request at the user device to access a legacy authentication service of a network resource,
wherein the provisioning message includes a request to determine whether to use the legacy authentication service of the network resource or a federated identity service to identify the user device
when the user device is to be identified by the federated identity service, sending a service request message to access the network resource, from the user device, over the communication network, to an identifier federation gateway;
receiving an identification message at the user device from the identifier federation gateway with a redirect instruction to the federated identity service when the user device is to be identified by the federated identity service;
sending identification data that indicates an identity for the user device to the federated identity service; and
receiving an authentication results message from the legacy authentication service via the identifier federation gateway,
wherein the authentication results message includes an indication that the user device is successfully identified by the federated identity service.

17. A non-transitory computer-readable storage medium of claim 16, wherein the authentication results message indicates a success or failure of identification of the user device.

18. A non-transitory computer-readable storage medium of claim 16, wherein the authentication results message includes an authentication token when there is a successful identification of the user device.

19. A non-transitory computer-readable storage medium of claim 16, wherein the authentication results message includes a URL with parameters that redirects the user device to the network resource.

20. A non-transitory computer-readable storage medium of claim 16, wherein the provisioning message further comprises a user device identifier.

* * * * *